(12) United States Patent
Berendes et al.

(10) Patent No.: US 10,784,738 B2
(45) Date of Patent: Sep. 22, 2020

(54) METHOD FOR PRODUCING AN ELECTRIC DRIVE MACHINE AND ELECTRIC DRIVE MACHINE

(71) Applicant: Dr. Ing. h.c. F. Porsche Aktiengesellschaft, Stuttgart (DE)

(72) Inventors: Philipp Berendes, Stuttgart (DE); Stefan Oechslen, Stuttgart (DE); Bernhard Wiedemann, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 167 days.

(21) Appl. No.: 15/884,616

(22) Filed: Jan. 31, 2018

(65) Prior Publication Data
US 2018/0226855 A1 Aug. 9, 2018

(30) Foreign Application Priority Data
Feb. 3, 2017 (DE) .................. 10 2017 102 141

(51) Int. Cl.
| | |
|---|---|
| *H02K 3/34* | (2006.01) |
| *H02K 9/19* | (2006.01) |
| *H02K 15/12* | (2006.01) |
| *H02K 9/197* | (2006.01) |
| *H02K 15/14* | (2006.01) |
| *H02K 3/487* | (2006.01) |
| *H02K 5/128* | (2006.01) |

(52) U.S. Cl.
CPC .............. *H02K 3/34* (2013.01); *H02K 3/487* (2013.01); *H02K 9/19* (2013.01); *H02K 9/197* (2013.01); *H02K 15/125* (2013.01); *H02K 15/14* (2013.01); *H02K 2005/1287* (2013.01)

(58) Field of Classification Search
CPC ............ H02K 3/34; H02K 15/12; H02K 9/19; H02K 9/197; H02K 15/125; H02K 15/14; H02K 3/487; H02K 2005/1287
USPC .................................................... 310/85–89
See application file for complete search history.

(56) References Cited

U.S. PATENT DOCUMENTS

| | | | | |
|---|---|---|---|---|
| 4,486,677 A | * | 12/1984 | Yamamoto | H02K 9/08 165/104.13 |
| 5,233,248 A | * | 8/1993 | Kawamura | H02K 1/185 310/156.25 |
| 5,490,319 A | * | 2/1996 | Nakamura | C08K 3/34 264/272.11 |
| 5,698,917 A | * | 12/1997 | Shultz | F16C 32/0465 310/214 |

(Continued)

FOREIGN PATENT DOCUMENTS

| | | |
|---|---|---|
| DE | 102010055823 A1 | 6/2012 |
| DE | 202010018078 U1 | 1/2014 |

(Continued)

OTHER PUBLICATIONS

Notification of Reason for Rejection for Japanese Application No. 2018-014280, dated Jan. 29, 2019, 4 pages.

(Continued)

*Primary Examiner* — Naishadh N Desai
(74) *Attorney, Agent, or Firm* — RatnerPrestia

(57) ABSTRACT

A method for producing an electric drive machine, including the steps of providing a stator having a cavity for the introduction of a rotor and introducing a hardenable seal into the cavity in contact with the stator and then hardening the seal.

12 Claims, 9 Drawing Sheets

(56) References Cited

U.S. PATENT DOCUMENTS

| | | | | |
|---|---|---|---|---|
| 7,839,036 B2* | 11/2010 | Hansen | ............... | H02K 5/1285 |
| | | | | 310/87 |
| 2003/0127924 A1* | 7/2003 | Van Dine | ............... | H02K 5/128 |
| | | | | 310/87 |
| 2003/0146670 A1* | 8/2003 | Van Dine | ............... | H02K 1/278 |
| | | | | 310/85 |
| 2010/0295395 A1* | 11/2010 | Baudelocque | ........ | F16C 32/047 |
| | | | | 310/86 |
| 2014/0054992 A1* | 2/2014 | Hasegawa | ............. | H02K 5/128 |
| | | | | 310/86 |
| 2015/0061437 A1* | 3/2015 | Hudec | .................. | H02K 5/128 |
| | | | | 310/86 |

FOREIGN PATENT DOCUMENTS

| | | | | | |
|---|---|---|---|---|---|
| EP | 0553831 | A2 | | 8/1993 | |
| EP | 2645542 | A2 * | 10/2013 | ............ | H02K 5/128 |
| JP | H05271465 | A | | 10/1993 | |
| JP | 2011166944 | A | | 8/2011 | |
| WO | 2011099603 | A1 | | 8/2011 | |

OTHER PUBLICATIONS

Chinese Office Action for Chinese Application No. 2018101053292, dated Sep. 4, 2019, 7 pages.

* cited by examiner

METHOD FOR PRODUCING AN ELECTRIC DRIVE MACHINE AND ELECTRIC DRIVE MACHINE

CROSS-REFERENCE TO RELATED APPLICATIONS

This application claims priority to German Patent Application No. DE 10 2017 102 141.8, filed Feb. 3, 2017, which is incorporated by reference herein in its entirety.

FIELD OF THE INVENTION

The invention relates to an electric drive machine and a method for producing an electric drive machine including the steps of providing a stator having a cavity for the introduction of a rotor, introducing a hardenable sealing means into the cavity in contact with the stator, and then hardening the sealing means.

BACKGROUND OF THE INVENTION

In an electric drive machine, heat is generated by some components during operation. This heat is carried away by means of a cooling liquid. The heat picked up by the cooling liquid is discharged to the surroundings, as a result of which the coolant cools down again and is again able to carry heat away from the components generating heat.

Electric drive machines have electric coils with windings. The windings are arranged in recesses in a base. The base can also be designated as a stator lamination pack. The windings frequently generate a major part of the heat and must therefore be cooled particularly well. A cooling liquid, for example an oil, is therefore frequently flushed directly around the windings in order to achieve a particularly good transfer of heat from the windings to the cooling liquid. The recesses therefore have to be sealed off with respect to the rotor space in order to prevent cooling liquid escaping into the rotor space. Cooling liquid in the rotor space could lead to high drag losses. In addition, the stator will then be cooled effectively only when the cooling medium flows exclusively through the stator space.

DE 20 2010 018 078 U1, which is incorporated by reference herein, discloses an electric drive machine in which, in order to seal off between the stator and the rotor, a thin-walled can is pressed in by means of an interference fit. DE 10 2010 055 823 B4, which is also incorporated by reference herein, discloses an end plate arranged parallel to the front end of the stator in order to partition off the winding heads.

In contrast, the present invention involves a simpler method for producing an electric drive machine which permits a particularly stable connection of a particularly thin sealing means to the stator. In addition, the intention is to devise an electric drive machine having a particularly thin and mechanically stable sealing means and a motor vehicle having such a drive machine.

Firstly, a stator having a cavity for the introduction of a rotor is provided. This can be done in a manner known from the prior art. In the finished state, the stator borders the rotor, at least one opening, preferably two mutually opposite openings, being provided in the longitudinal direction. The stator can, for example, have recesses in which windings of an electric coil are arranged. In addition, the rotor can also enclose the stator. For the sake of simplicity, in the following text what is known as an internal rotor is described, in which the rotor is arranged within the stator.

Introduced into the cavity is a hardenable sealing means, which is in contact with the stator. In the context of this description, the term "hardenable" is understood in particular to mean that the sealing means is relatively flexible in an initial state and is relatively rigid following a hardening process. The hardening can be carried out, for example, by the action of heat. For example, a fiber-reinforced plastic can be used as material for the sealing means. It is in particular possible that the sealing means consists of multiple layers of one or more fiber-reinforced plastics.

It is possible for the sealing means to be formed rotationally symmetrically. For example, the sealing means can be formed in the manner of a sleeve. In the finished state, the sealing means can seal off the recesses in the stator with respect to the rotor.

Following the introduction of the hardenable sealing means into the cavity, the sealing means is hardened. Preferably, the sealing means enters into an integral connection with the stator during the hardening process. Thus, a particularly stable connection between the stator and the sealing means is achieved. The method additionally permits the production of a very thin sealing means. The rotor can then be introduced into the cavity, so that the sealing means is arranged between the rotor and the stator.

By means of the selection of the temperature during the hardening and other parameters, a mechanical tension can be established between the sealing means and the stator. If the sealing means consists of a fiber-reinforced plastic, the fiber angle can likewise be used as a parameter for establishing the mechanical tension.

According to one embodiment of the invention, the sealing means can be pressed against the stator during the hardening. In this way, a particularly good integral connection is produced between the stator and the sealing means. For example, the sealing means can border an internal space and be formed in the manner of a sleeve. At the end of the production process, the rotor is inserted into the internal space. During the hardening, a force-exerting means, such as an aluminum bolt, silicone or an inflatable bellows, can be arranged in the internal space. Advantageously, the force-exerting means expands more significantly during the hardening than the stator and the sealing means, so that the sealing means is pressed against the stator. Following the hardening, the force-exerting means can be removed and the rotor can be inserted into the internal space.

According to one embodiment of the invention, the stator can comprise multiple stator laminations. The stator laminations can be integrally connected to one another during the hardening of the sealing means. As a result of the integral connection of the sealing means to the stator, both the grooves and the laminations are connected in the axial direction, by which means both the grooves and the spaces between the laminations are sealed off with respect to the rotor space.

For example, the stator laminations can be provided with a coating (e.g. a varnish), which connects the stator laminations integrally to one another during a heating treatment. Thus, the production is further simplified, in that the hardening of the coating is carried out at the same time as the hardening of the sealing means. In addition, a particularly good integral connection between the sealing means and the stator is achieved.

The electric drive machine comprises a stator, a rotor and a sealing means. The electric drive machine can preferably have been produced by a method as claimed in one embodiment of the invention. The stator comprises a base having recesses and windings of an electric coil that are arranged in the recesses. The sealing means seals off the recesses with respect to the rotor. In addition thereto, the sealing means can also seal off the interspaces between the lamination packs of the stator with respect to the rotor. The sealing means is connected to the stator in a form-fitting and/or force-fitting manner. The sealing means comprises at least two layers that can be distinguished from one another. The layers can consist of the same material or different materials. For example, both materials can be a single fiber-reinforced plastic, wherein the layers can then each correspond to one laminate layer. If the layers consist of the same material, the layers can have different fiber angles. This can mean that the fibers of the fiber reinforced plastic are aligned differently. As a result of the layer structure, amongst other things mechanical tensions between the sealing means and the stator can be established.

It is also possible for the sealing means to have only one layer, within which there are different fiber angles. Within the context of this description, this arrangement is likewise to be understood as distinguishable layers.

According to one embodiment of the invention, the sealing means can comprise pre-impregnated fibers. Thus, a particularly good integral connection to the stator can be achieved.

According to one embodiment of the invention, the sealing means can be hardened in an inherently stable manner. The sealing means is then supported exclusively on the base.

According to one embodiment of the invention, the stator can comprise a supporting means which is arranged between the base and the sealing means. As an alternative thereto, the supporting means can be arranged adjacent to the base. The supporting means can be designed to support the sealing means mechanically. The sealing means can be connected to the supporting means in a form-fitting manner.

The supporting means can, for example, be fixed to the base. The fixing can be carried out in a form-fitting and/or integral manner. For example, the supporting means can be formed as a supporting ring, which is pushed in or pressed into a ledge on the base. The supporting means can also be formed as a projection on the base.

According to one embodiment of the invention, the windings can have winding heads. In the region of the winding heads, the stator can comprise a partitioning means, which is pushed into the base or adjoins the base. The partitioning means can be integrally connected to the sealing means. The partitioning means can partition off the region in which the winding heads are arranged from the rotor. The partitioning means can be provided in addition to the supporting means. As an alternative thereto, the partitioning means can also perform the function of the supporting means. The partitioning means can also be implemented so as to adjoin the base.

According to one embodiment of the invention, the partitioning means and/or the supporting means can consist of an electrically insulating material or be coated in an electrically insulating manner. This is advantageous for good functioning of the electric drive machine. Alternatively or additionally to this, the winding head can also be coated in an electrically insulating manner.

According to one embodiment of the invention, the sealing means can have a uniform cross-sectional region over the entire length of the base. In this way, the sealing means can be formed particularly thinly, as a result of which the gap between stator and rotor can be particularly small, in order to improve the efficiency of the electric drive machine. The particularly thin formation of the sealing means can be achieved in particular by the large-region attachment of the sealing means to the base of the stator. Advantageously, the sealing means is attached completely to the base outside the region of the grooves. A constant cross-sectional region additionally benefits the low air gap.

Embodiments of the invention are particularly advantageous, since the windings can optionally be introduced before or after the introduction of the sealing means.

BRIEF DESCRIPTION OF THE DRAWINGS

Further features and advantages of the present invention will become clear by using the following description of preferred exemplary embodiments with reference to the appended figures. Here, the same designations are used for the same or similar components and for components with the same or similar functions.

DETAILED DESCRIPTION OF THE INVENTION

Figure 1:
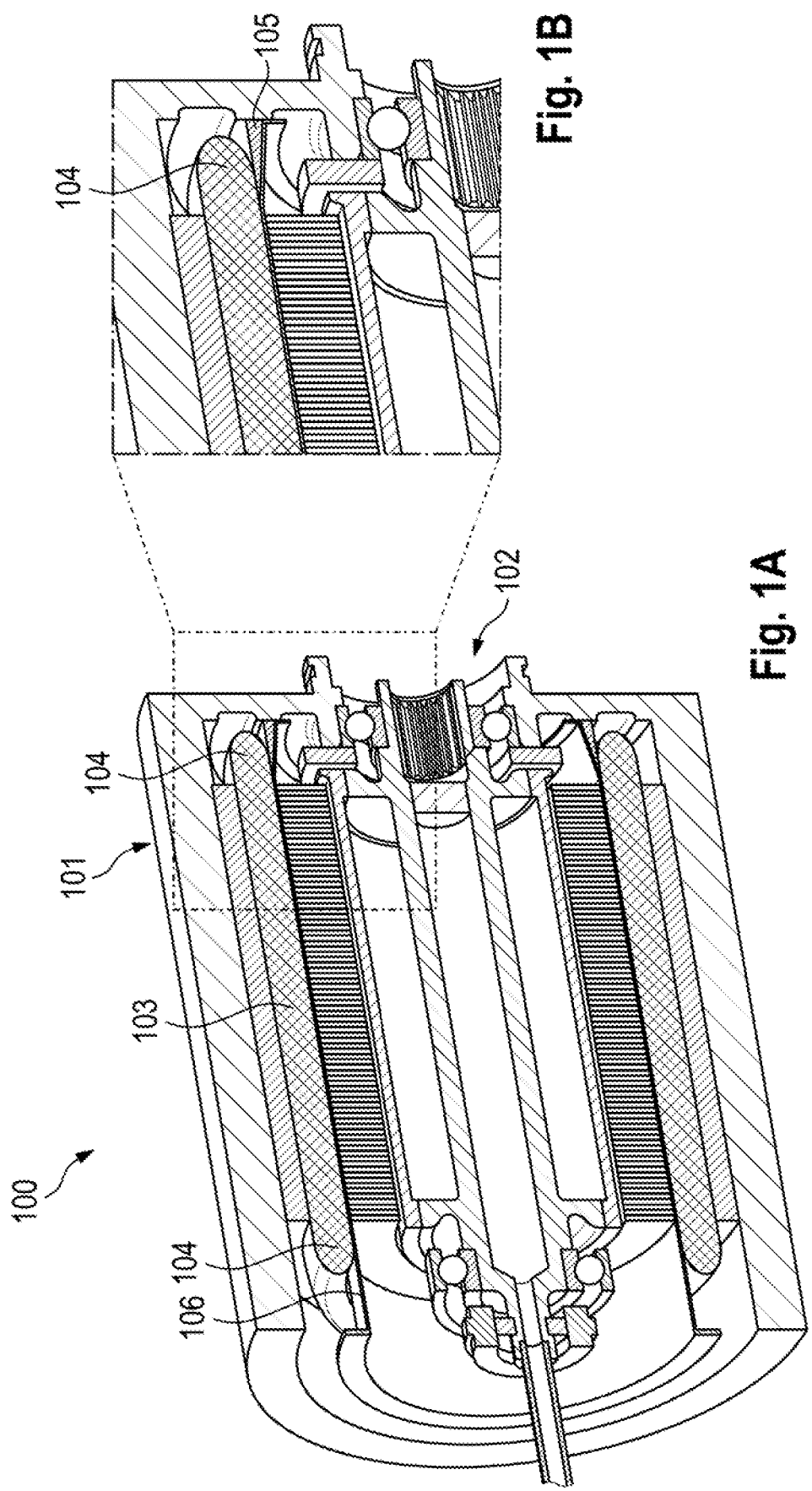
FIG. 1A shows a schematic sectional view of an electric drive machine according to one embodiment of the invention.
FIG. 1B shows an enlarged detail from FIG. 1A.
Figure 2:
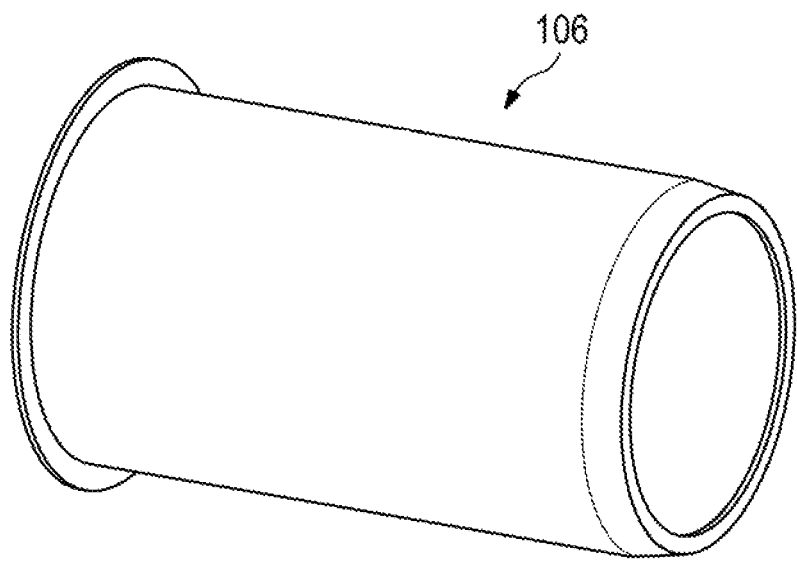
FIG. 2 shows a schematic perspective view of a sealing means according to one embodiment of the invention.
Figure 3:
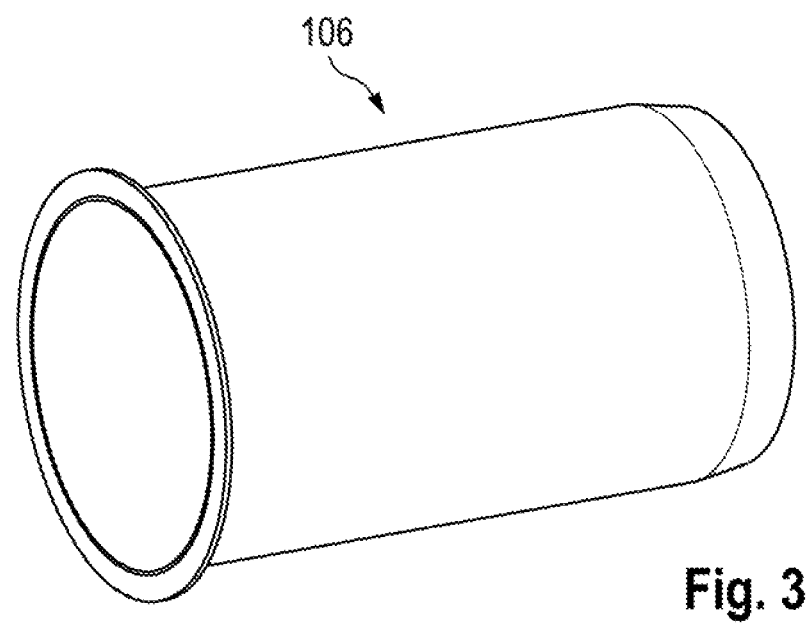
FIG. 3 shows a schematic perspective view of the sealing means from FIG. 2.
Figure 4:
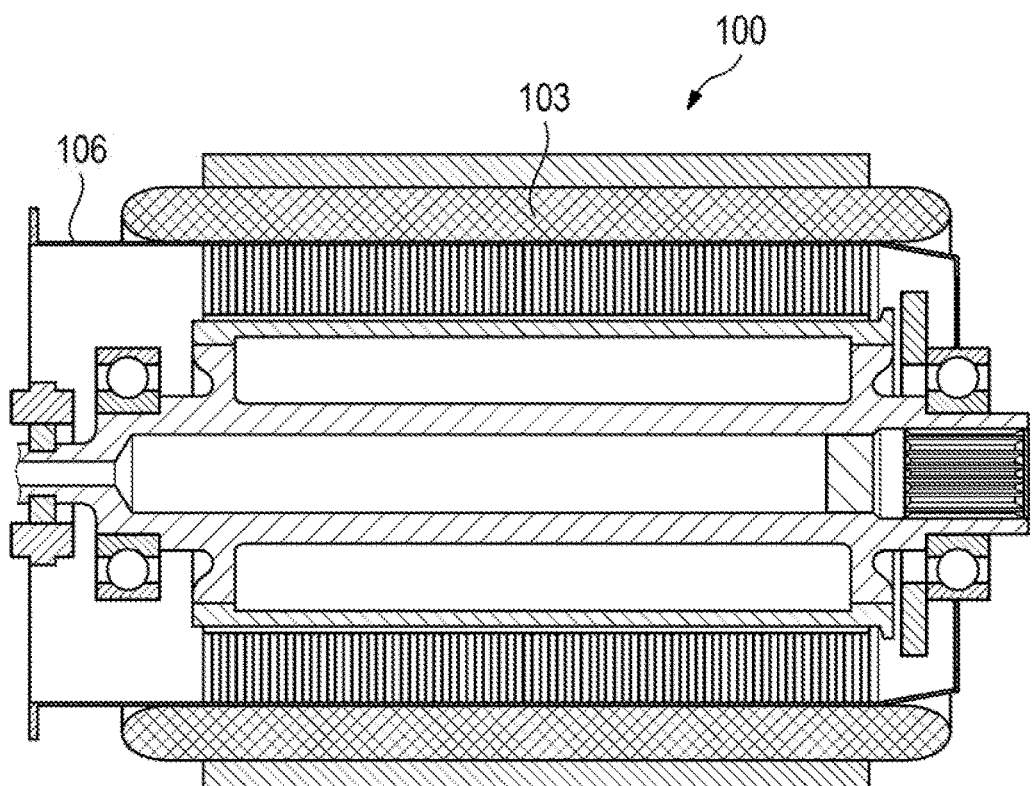
FIG. 4 shows a schematic sectional view of an electric drive machine according to one embodiment of the invention.
Figure 5:
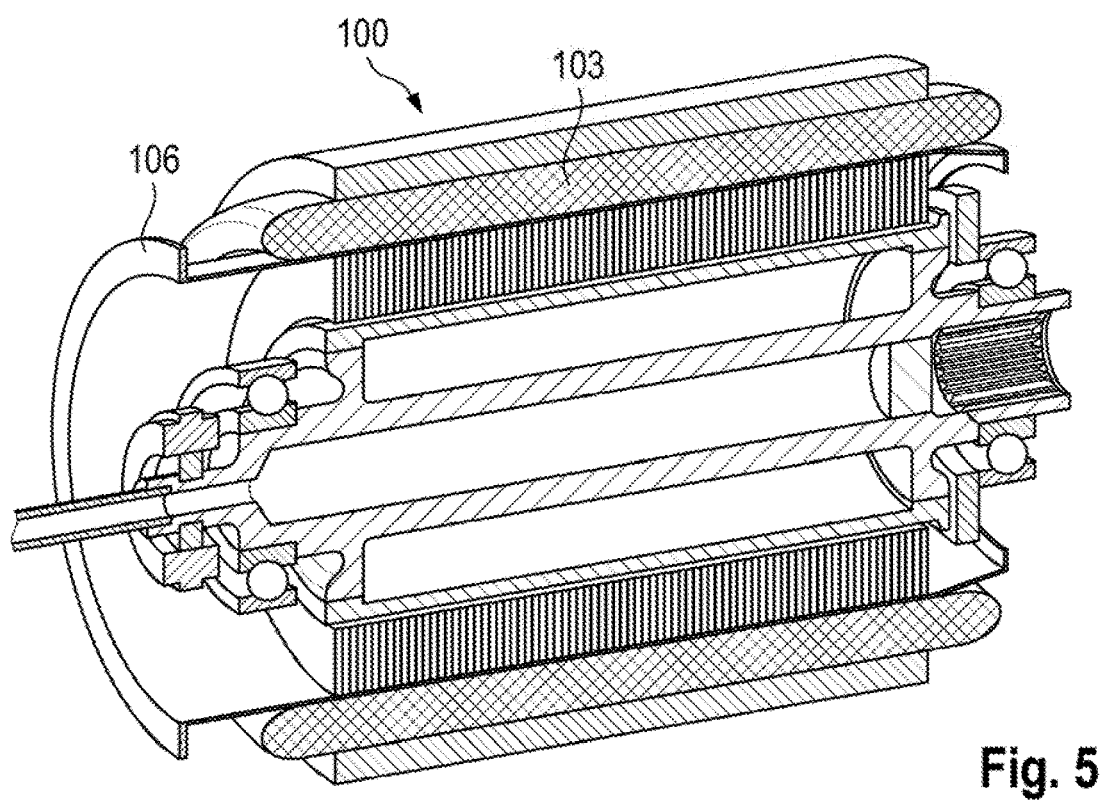
FIG. 5 shows a schematic sectional view of the drive machine from FIG. 4.

The electric drive machine 100 comprises a stator 101 and a rotor 102. Arranged in the stator 101 are windings 103 of an electric coil, which is needed for the drive of the rotor 102 with electromagnetic force. The coils each have winding heads 104 at the ends of their longitudinal sides.

The windings 103 are cooled by a fluid during operation. Arranged between the stator 101 and the rotor 102 is a sealing means 106, which seals off the windings 103 in the stator 101 from the rotor 102, in order to prevent the fluid getting into the rotor 102 or into the rotor space or getting into the interspace between the rotor 102 and the stator 101. The sealing means 106 is integrally connected to the stator and is supported by the latter. Particularly in the region of the winding heads 104, the sealing means 106 is supported by a supporting means in the form of a projection 105 integrally molded on the base of the stator 101.

To produce the electric drive machine, the sealing means 106, preferably consisting of one or more fiber-reinforced plastics, is laid on the stator 101 in the soft, deformable state, and subsequently hardened, so that an integral connection between the stator 101 and the sealing means 106 is produced. During the hardening, the sealing means 106 is pressed against the stator 101. This can be done, for example, by a force-exerting means arranged within the sealing means 106. The force-exerting means can be, for example, an inflatable bellows or a metal core, which expands more highly under heat than the stator and/or the sealing means 106. Following the hardening, the force-exerting means is removed from the sealing means 106 and the rotor 102 can be inserted.

As a result of the hardening in the state pressed against the stator 101, a particularly good connection is produced between the sealing means 106 and the stator 101. As a result, the sealing means 106 can be formed particularly thinly.

Figure 6:
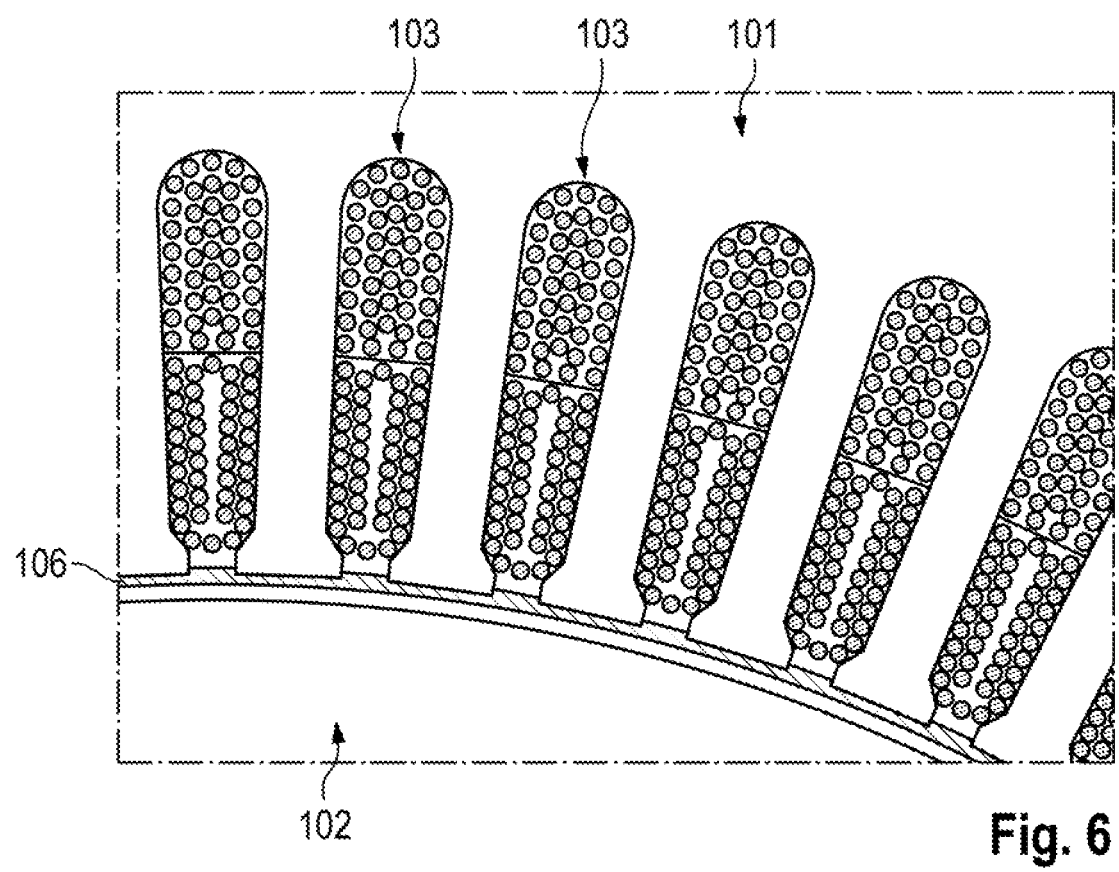
FIG. 6 shows a schematic sectional view of a detail of an electric drive machine according to one embodiment of the invention.
Figure 7:
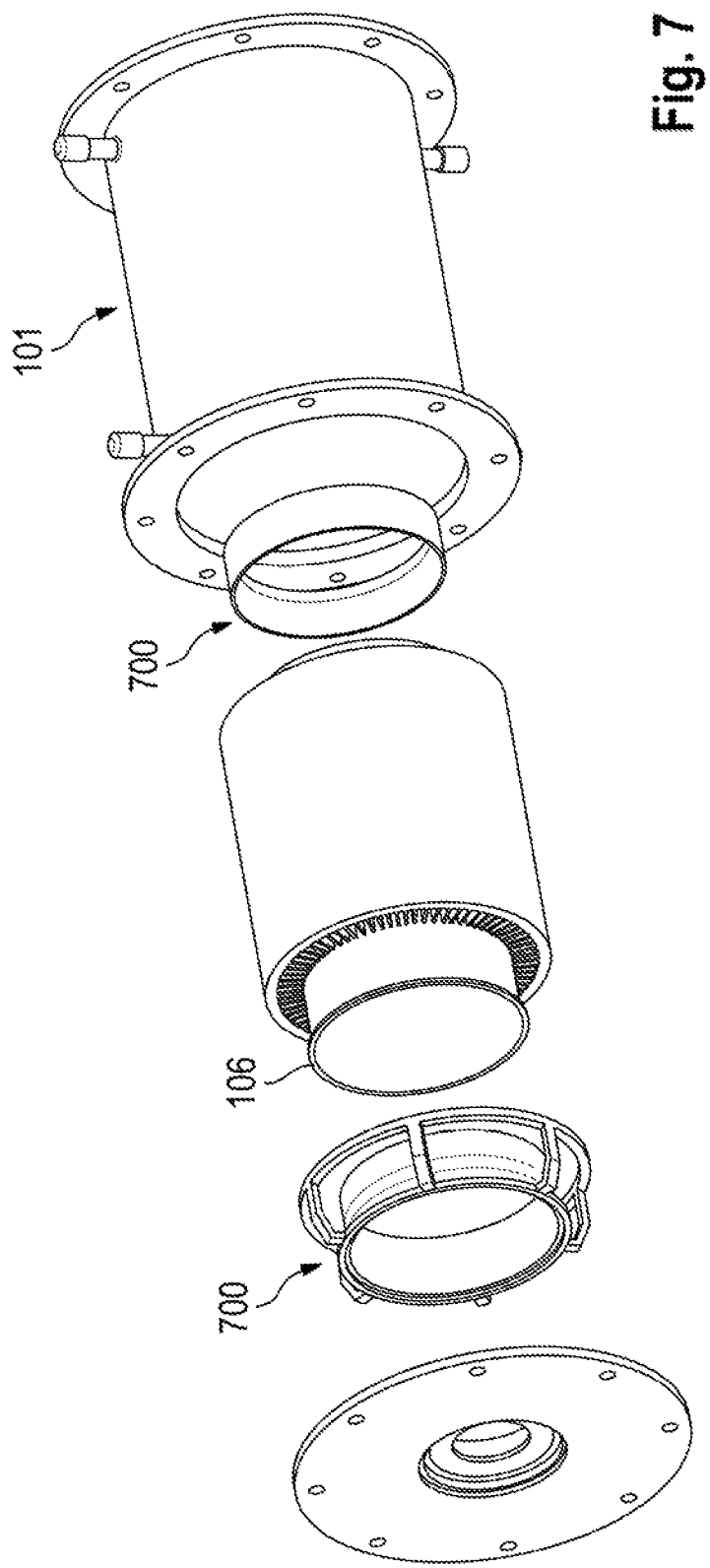
FIG. 7 shows a schematic exploded illustration of an electric drive machine according to one embodiment of the invention.
Figure 8:
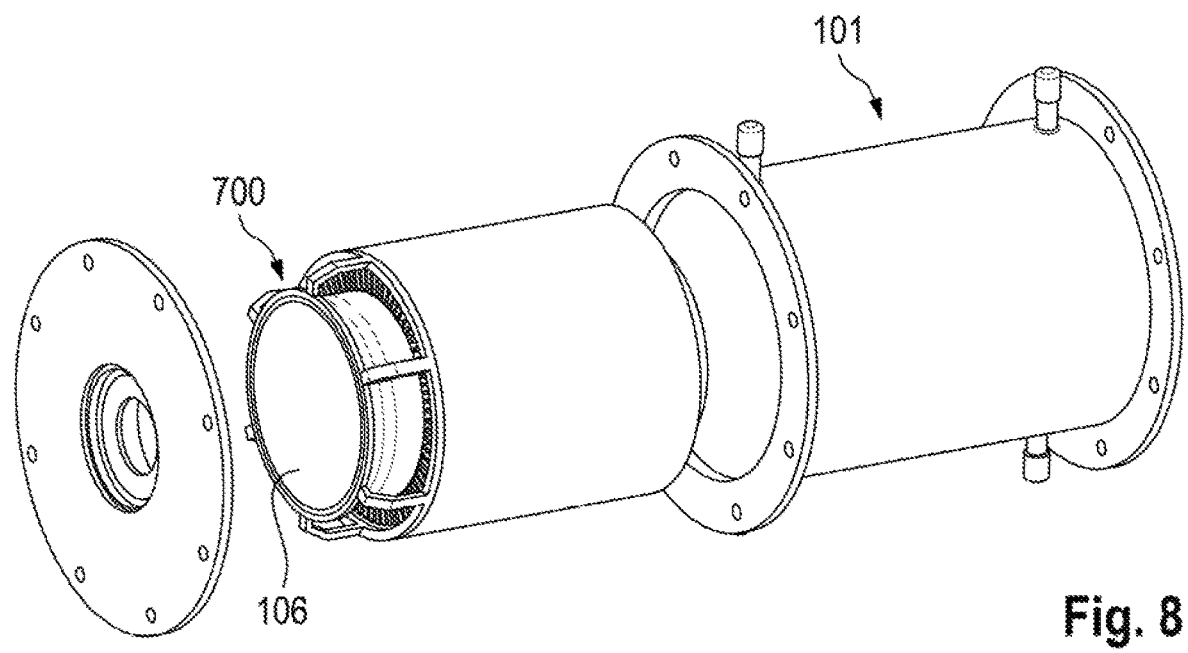
FIG. 8 shows a schematic exploded illustration of the drive machine from FIG. 7.
Figure 9:
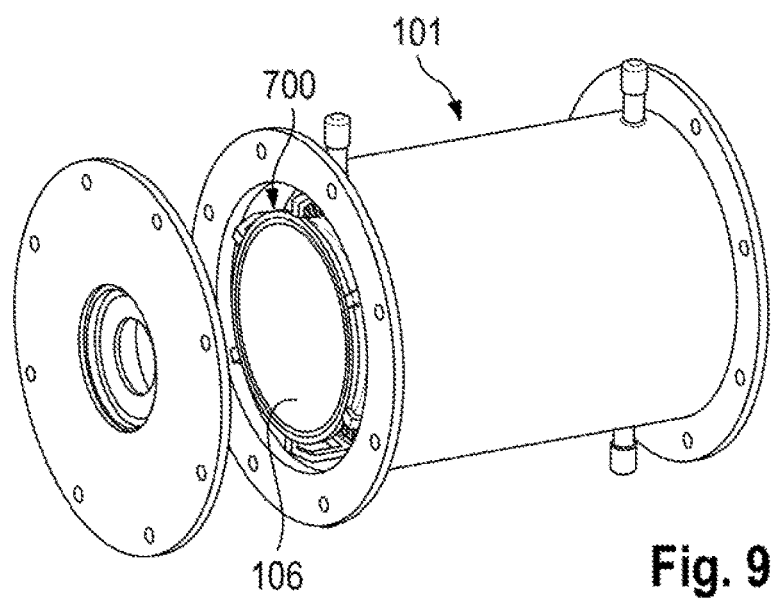
FIG. 9 shows a schematic exploded illustration of the drive machine from FIG. 7.
Figure 10:
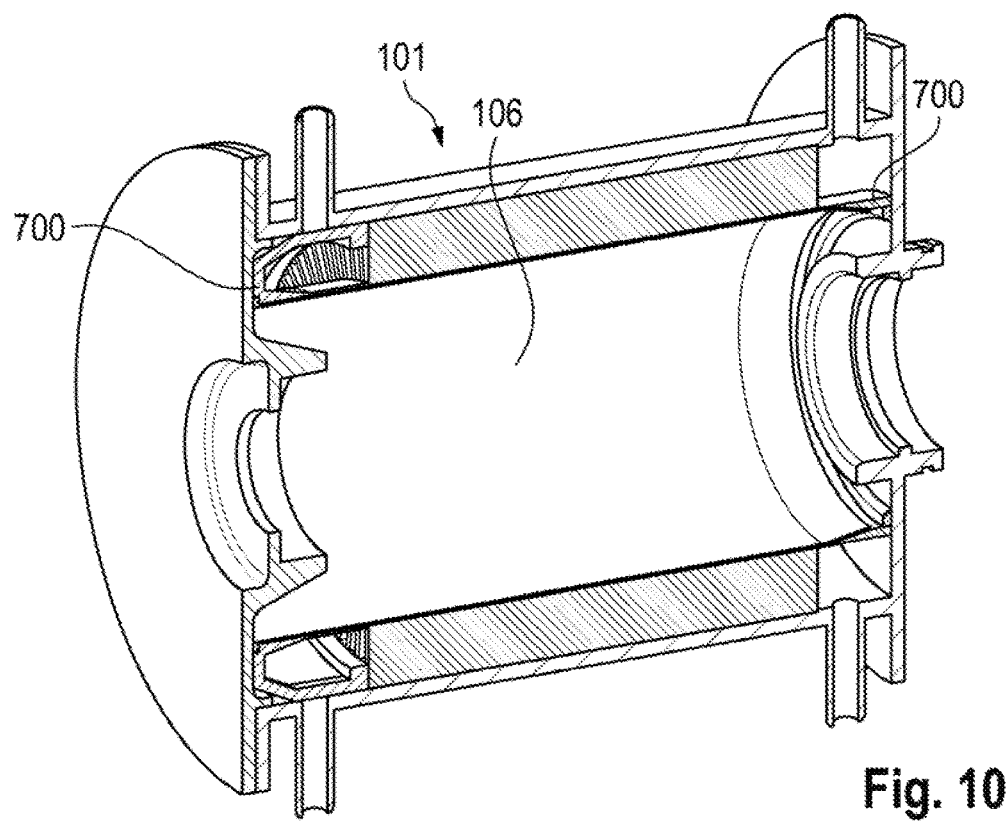
FIG. 10 shows a schematic sectional view of a stator having a sealing means according to one embodiment of the invention.
Figure 11:
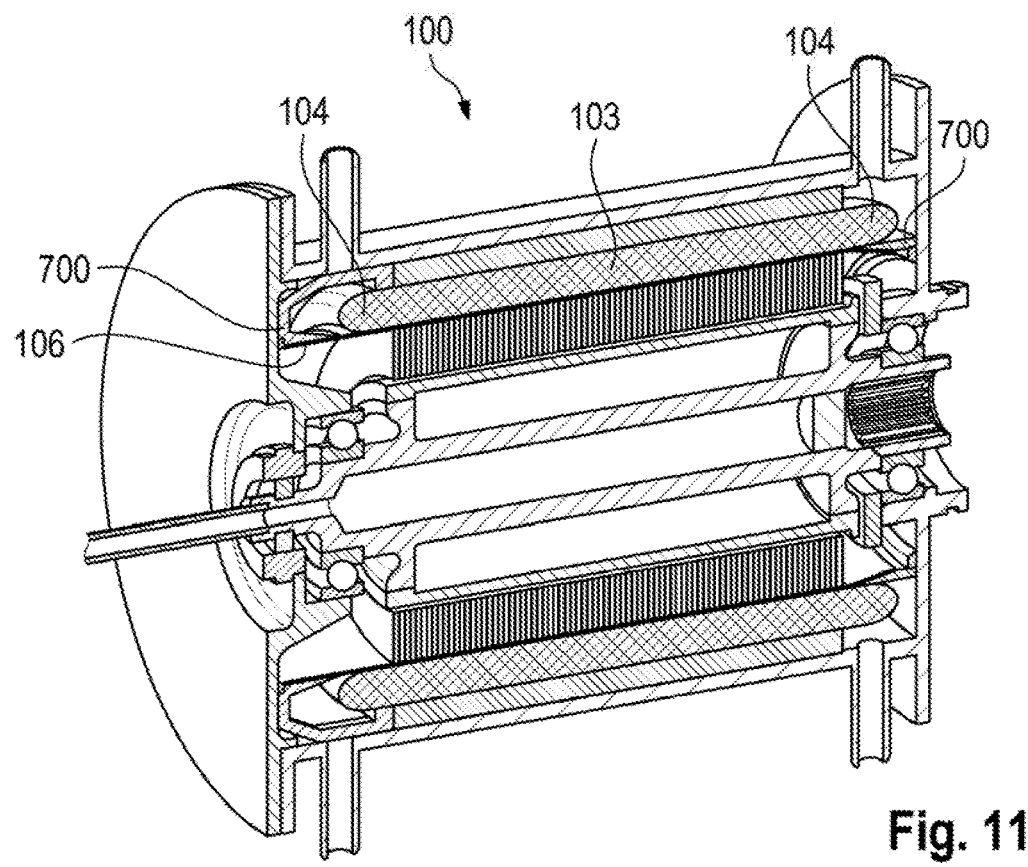
FIG. 11 shows a schematic sectional view of an electric drive machine according to one embodiment of the invention, comprising the stator from FIG. 10.
Figure 12:
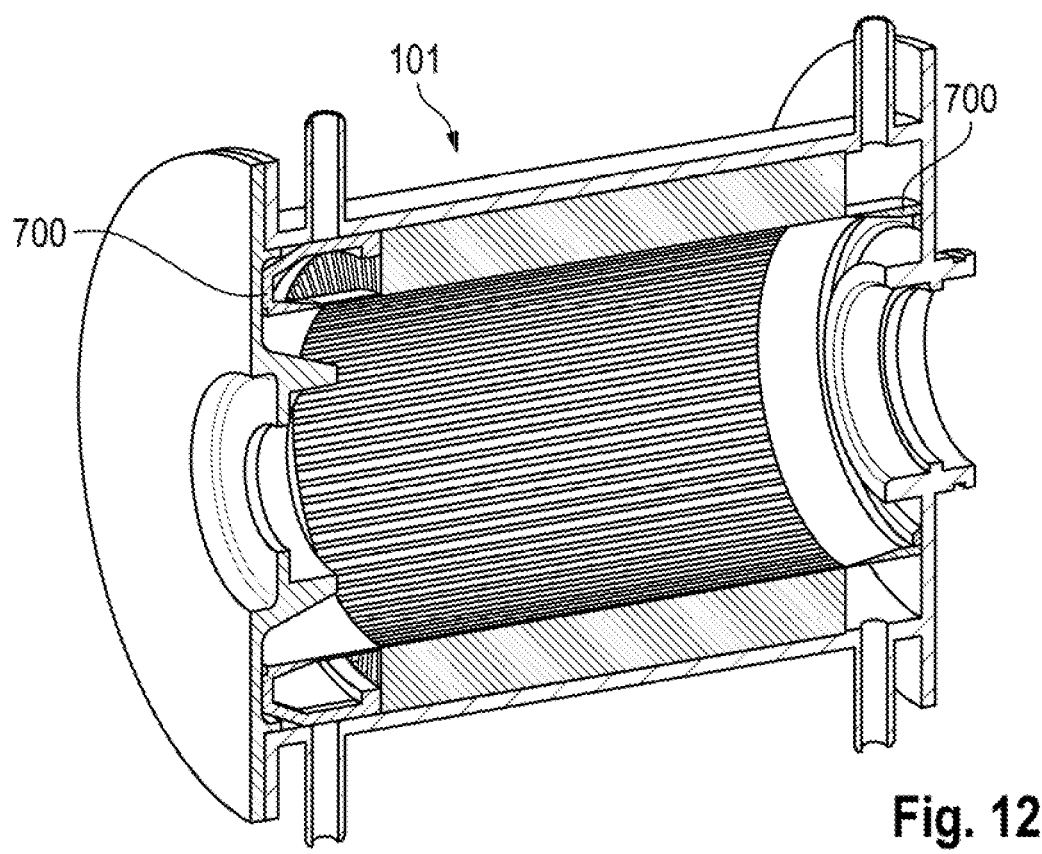
FIG. 12 shows a schematic sectional view of the stator from FIG. 10 without sealing means.
Figure 13:
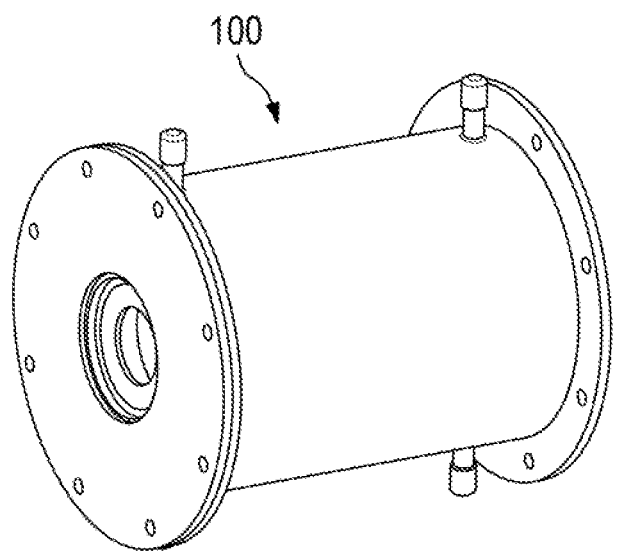
FIG. 13 shows a schematic perspective view of an electric drive machine according to one embodiment of the invention.

FIG. 6 illustrates that the sealing means 106 in the region of recesses in the stator 101 for receiving the windings 103 can have a greater thickness than between these recesses. This is advantageous for a particularly reliable sealing of the recesses with at the same time, a particularly small distance of the rotor 102 from the stator 101. The particularly low distance is advantageous for a high efficiency of the electric drive machine 100. For example, the sealing means 106 between the recesses can have a thickness of less than 1 mm. In the region of the recesses, the thickness can be, for example, three to five times as great.

As an alternative to the projection 105 illustrated in FIG. 1, a supporting ring 700 can also be used as supporting means for the sealing means 106 (FIGS. 7 to 12). Said supporting ring is arranged between the base of the stator 101 and the sealing means 106 in the region of the winding heads 104.

Both the supporting ring 700 and the projection 105, in addition to the supporting function of the sealing means 106, fulfill a partitioning function of the winding heads 104 from the rotor 102, so that particularly good sealing is provided here.

The supporting ring 700 and in particular be implemented with a constant cross-sectional region.

Figure 14:
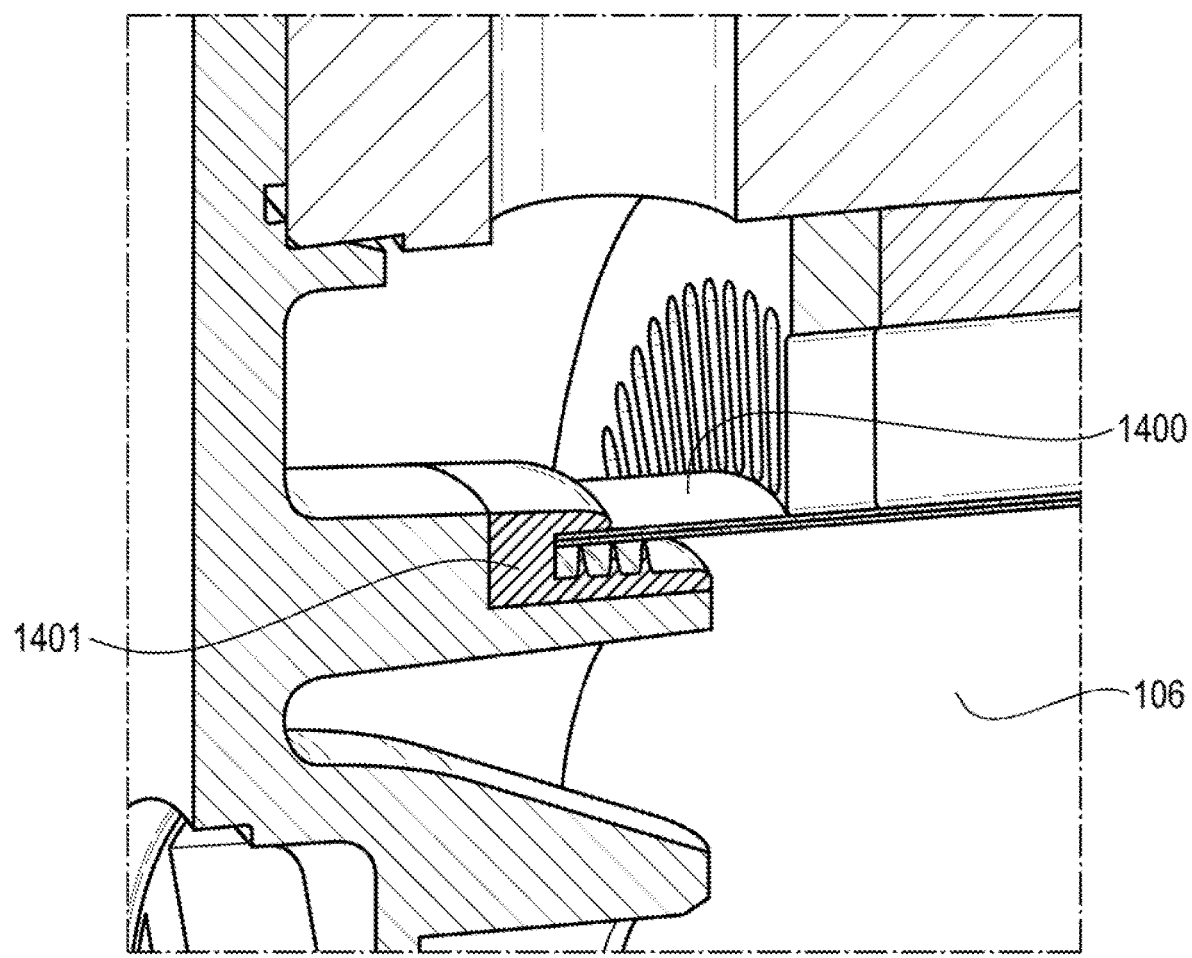
FIG. 14 shows a schematic perspective view of a detail from an electric drive machine according to one embodiment of the invention.

An alternative to the supporting ring 700 and to the projection 105 is illustrated in FIG. 14. A supporting means 1400 and a sealant 1401 are provided. The supporting means 1400 supports the sealing means 106 mechanically. The sealant 1401 seals the stator off with respect to the rotor space.

What is claimed is:
1. An electric drive machine comprising:
  a stator comprising a base having recesses and windings of an electric coil that are arranged in the recesses,
  a rotor,
  a sealing means partially positioned within the recesses for sealing off the recesses with respect to the rotor, the sealing means being connected to the stator in a form-fitting or force-fitting manner,
  a sealant mounted to a body of the electric drive machine and having a groove and a series of radially extending projections that are spaced apart within the groove, and
  a supporting means mounted to and positioned about said sealing means,
  wherein ends of the sealant and the supporting means extend axially beyond the base of the stator and the rotor and into the groove of the sealant,
  wherein the sealing means comprises at least two layers of materials that are distinguishable from one another.
2. The electric drive machine as claimed in claim 1, wherein the sealing means comprises pre-impregnated fibers.
3. The electric drive machine as claimed in claim 1, wherein the supporting means is configured to mechanically support the sealing means.
4. The electric drive machine as claimed in claim 3, wherein the supporting means either comprises an electrically insulating material or is coated in an electrically insulating manner.
5. The electric drive machine as claimed in claim 1, wherein the windings have winding heads, wherein the stator in a region of the winding heads comprises a partitioning means, which is pushed into the base or adjoins the base, wherein the partitioning means is integrally connected to the sealing means.
6. The electric drive machine as claimed in claim 5, wherein the partitioning means either comprises an electrically insulating material or is coated in an electrically insulating manner.
7. The electric drive machine as claimed in claim 1, wherein the sealing means has substantially a uniform cross-sectional region over an entire length of the base.
8. A motor vehicle comprising an electric drive machine, the electric drive machine including:
  a stator comprising a base having recesses and windings of an electric coil that are arranged in the recesses,
  a rotor,
  a sealing means partially positioned within the recesses for sealing off the recesses with respect to the rotor, the sealing means being connected to the stator in a form-fitting or force-fitting manner,
  a sealant mounted to a body of the electric drive machine and having a groove and a series of radially extending projections that are spaced apart within the groove, and
  a supporting means mounted to and positioned about said sealing means,
  wherein ends of the sealant and the supporting means extend axially beyond the base of the stator and the rotor and into the groove of the sealant,
  wherein the sealing means comprises at least two layers of materials that are distinguishable from one another.
9. The electric drive machine as claimed in claim 1, wherein the stator comprises multiple stator laminations, and the stator laminations are integrally connected to one another.
10. The motor vehicle as claimed in claim 8, wherein the stator comprises multiple stator laminations, and the stator laminations are integrally connected to one another.
11. The electric drive machine as claimed in claim 1, wherein the sealing means has a greater thickness at the recesses than at a location between the recesses.
12. The motor vehicle as claimed in claim 8, wherein the sealing means has a greater thickness at the recesses than at a location between the recesses.

* * * * *